United States Patent [19]

Caputo

[11] Patent Number: 4,579,516

[45] Date of Patent: Apr. 1, 1986

[54] FORMING ROLLER FOR PRODUCING AIR-CUSHIONING PRODUCT

[76] Inventor: Garry L. Caputo, 464 Riverside Ave., Rutherford, N.J. 07070

[21] Appl. No.: 755,083

[22] Filed: Jul. 15, 1985

[51] Int. Cl.$^4$ ............................................. B29C 51/10
[52] U.S. Cl. ................................... 425/388; 156/498; 264/101; 264/571; 425/DIG. 60
[58] Field of Search ............................ 29/121.1, 121.6; 156/77, 145, 209, 498, 499; 219/469; 264/101, 571; 425/388, DIG. 60

[56] References Cited

U.S. PATENT DOCUMENTS

| | | | |
|---|---|---|---|
| 3,142,599 | 7/1964 | Chavannes | 156/210 |
| 3,285,793 | 11/1966 | Chavannes | 156/210 |
| 3,416,984 | 12/1968 | Chavannes et al. | 156/209 |
| 4,412,879 | 11/1983 | Ottaviano | 156/145 |
| 4,427,474 | 1/1984 | Ottaviano | 156/145 |

*Primary Examiner*—Robert A. Dawson
*Attorney, Agent, or Firm*—Ralph R. Roberts

[57] ABSTRACT

This invention discloses a forming roller used in the production of air packaging or dunnage. This forming roller receives heated thermoplastic film brought to the peripheral surface and with vacuum draws this softened film into formed cavities to provide bubbles or blisters in said film. The roller is made of a rapid heat-conducting metal such as aluminum. A shaft providing stiffness is inserted in the roller and fluid conduits in the shaft ends communicate with a counterbore formed in both ends of the roller. Fluid-conducting passageways are drilled in this roller and carry controlled-temperature fluid from one end of the roller to the other. In this same roller is formed vacuum-conducting drilled holes that communicate with the multiplicity of formed pockets in the peripheral surface of the roller. A collector shoe having an arc-shaped cavity is disposed to engage at one time about one-half of the vacuum conductors and is disposed to carry vacuum to these conductors as the roller is turned. The other ends of these conductors are closed and as the open ends of these conductors move from in way of the shoe, vacuum is removed and atmosphere allows the bubble or blister portions to be lifted from within the pockets.

15 Claims, 4 Drawing Figures

FORMING ROLLER FOR PRODUCING AIR-CUSHIONING PRODUCT

CROSS-REFERENCE TO RELATED APPLICATION

This roller is used with the apparatus shown and described in my U.S. patent application Ser. No. 669,684, as filed Nov. 9, 1984, and entitled "On Demand" Apparatus and Method for Producing Air-Cushioning Product. To the extent applicable, this application and any patent issuing therefrom is incorporated by reference into this instant application.

BACKGROUND OF THE INVENTION

1. Field of the Invention

This invention is believed to be found in the apparatus pertaining to the forming of air-cushioning material. The apparatus for forming air-cushioning dunnage is well known, but the forming roll providing a simple and positive control of the surface temperature of the roll is unique.

2. Description of the Prior Art

Air-cushioning material is well known as packing dunnage both for its low cost and light weight and also for its convenience and strength. This dunnage product utilizes flexible plastic sheet material and in the present invention the forming roll and its construction are directed to and toward producing thermoplastic films in strip or roll form. The roller of this invention receives a plastic sheet which is heated to bring a surface to a temperature in the proximity of fusion, welding or melting. This heated sheet is brought to this roller where it is shaped by cavities provided in an embossing pattern. Vacuum is used to form this sheet. Another sheet or strip of film is heated to a fusion or welding temperature and then laminated to the thermoformed sheet of film. This roller is uniquely constructed so that the temperatures of the film surfaces at the weld which are produced in conjunction with this roller are sufficient for the weld to be achieved, and are of course equalized when fusion or welding is achieved.

There are many patents in the air cell cushioning dunnage field, such as, for instance, Australian Pat. No. 160,551, published Oct 29, 1953, and U.S. Pat. Nos. 3,018,015; 3,142,599; 3,231,454; 3,285,793; 3,349,990; 3,577,305; 3,389,534; 3,523,055; 3,575,781; 3,616,155; 3,785,899; 3,817,803; 3,837,990; 3,837,991; 3,868,056; 4,076,872; and 4,096,306. In addition, U.S. Pat. Nos. 3,416,984 and 3,392,081 show basic construction methods, and U.S. Pat. Nos. 4,415,398 and 4,427,474 show plural sheets and/or drum apparatus. The prior art does not show or suggest the construction of the roller of this invention which provides a rugged and foolproof temperature control of the surface of the roller. This construction of the roller lends itself to the minimum of attention and maintenance.

SUMMARY OF THE INVENTION

The invention to be described and illustrated hereinafter provides apparatus in which a forming roller is provided for the production of air-cushioning dunnage with flexible sheeting material supplied in roll form. The films are of high strength and high resistance to loss from the produced cells. The roller used in this production apparatus of this invention is small in size and can be interrupted conveniently in operation without destroying the desired product and its intended end use.

This invention may be summarized, at least in part, with reference to its objects. It is an object of this invention to provide, and it does provide, a novel forming roller construction for the production of air-cushioning dunnage in strip form.

It is a further object of this invention to provide, and it does provide, a quite compact roller of rapid heat-conducting metal and with a steel shaft adapted to carry and rotate this roller. This roller is formed with a multiplicity of cavities on the outer surface portion, with these cavities in flow communication with vacuum channels therein. This same roller is also provided with a water-conducting means whereby the temperature of the roller may be adjusted to bring and maintain the temperature of the film at the desired temperature no matter the speed or interruptions of the heated film to the roller.

In brief, this roller apparatus is very rugged and requires a minimum of maintenance. As a rapid heat-conducting metal roller, this roller is carried on a steel shaft to maintain rigidity and ease of construction. This roller except for the shaft is made of a one-piece aluminum member whose outer surface is treated to provide a release surface and resistance to wear. These cavities are sized and contoured to provide the desired air-cushioning product. These cavities are connected by small drilled holes to longitudinally-drilled conduit holes having one end exiting at a finished surface on the roller and with the other end plugged to close the end of this conduit hole. An arc-shaped scution connector is brought to and against that end of the roller having the open end of the conduit holes and this connector is made and positioned to provide vacuum only when the film is to be shaped.

This same roller has another set of longitudinally-formed water-conducting holes. These holes are inward of the vacuum conduit holes and are open at both ends and open into a counterbore forming and providing a fluid-receiving recess. The shaft provided for the roller is drilled from each end and cross-drilled to provide a fluid conductor from and to this recess formed in the end of the roller. The counterbore recess in and at both ends of the roller is closed by end seal plates and O-rings so as to provide fluid-tight conducting means at pressures as much as line pressure. Temperature controls for the water are contemplated so the temperature and flow of fluid may be adjusted to provide and maintain the desired temperature in the heated film. The swivel joints for the water conductors to and from the roller are conventional and no patentable distinction is ascribed thereto.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there has been chosen a specific embodiment of a forming roller as adopted for use for producing air-cushioning dunnage and showing a preferred means for constructing said roller. This specific embodiment has been chosen for the purposes of illustration and description as shown in the accompanying drawings wherein:

BRIEF DESCRIPTION OF THE DRAWINGS

In the following description and in the claims, various details are identified by specific names for convenience. These names are intended to be generic in their application. Corresponding reference characters refer to like members throughout the four figures of the two sheets of drawings.

Figure 1:
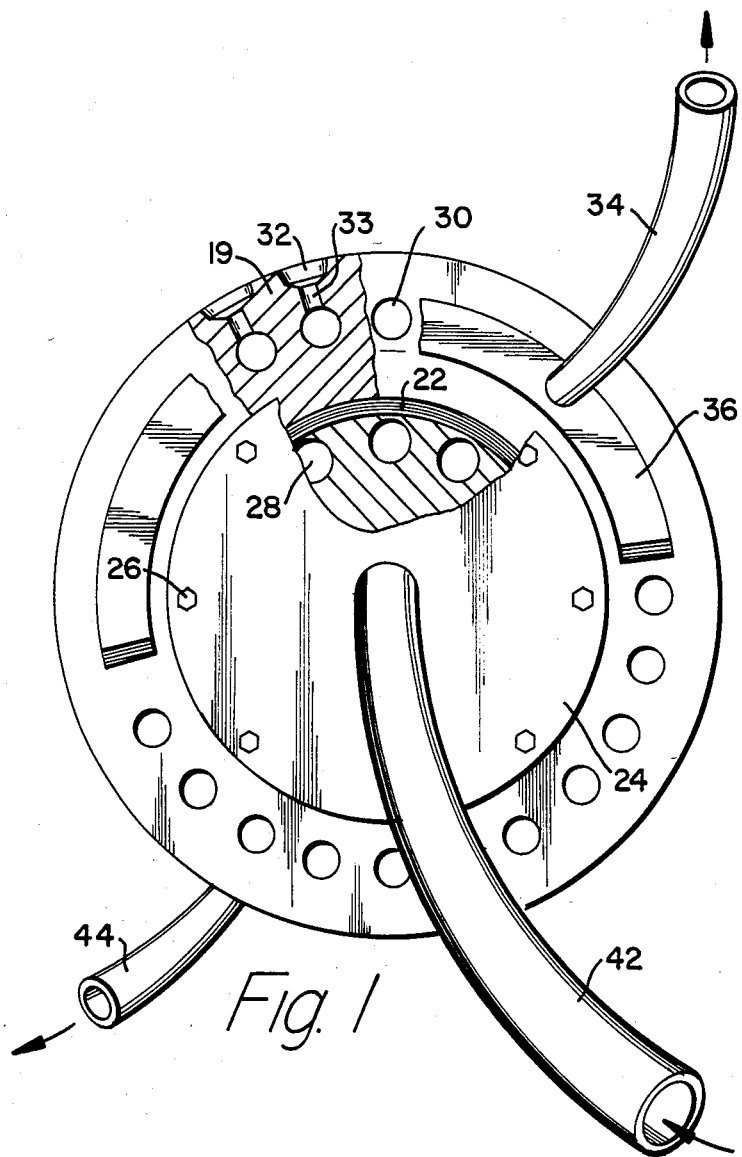
FIG. 1 represents an end view, partly diagrammatic, and showing the vacuum forming roll and the means for water-cooling this roll.

The drawings accompanying, and forming part of, this specification disclose details of construction for the purpose of explanation, but structural details may be modified without departure from the concept and principles of the invention and the invention may be incorporated in other structural forms than shown.

DESCRIPTION OF THE PREFERRED EMBODIMENT

Referring next to the drawings and the vacuum forming roll assembly as particularly used with and in the apparatus for the making of the air-cushioning material of the referenced application, a steel shaft 10 of selected size and length has extending end portions which are provided with cut-out portions 12. These cut-outs are conventionally formed for the securing thereto of rotary connections of water attachments (not shown). This shaft has each end drilled at 14 to provide a fluid conduit to the inner portion of this shaft. This drilled hole 14 is cross-drilled to provide distributing holes or conduits 16 and the exit ends thereof terminate at and in a counterbore 18 which is provided in a like manner in both ends of a metal roller or member 19. Water or like fluid is prevented from leaking past the shaft 10 by O-rings 20 provided at each end of the shaft. O-rings 22 are sized to enter and retain the water at the O.D. of counterbore chamber 18.

Figure 3:
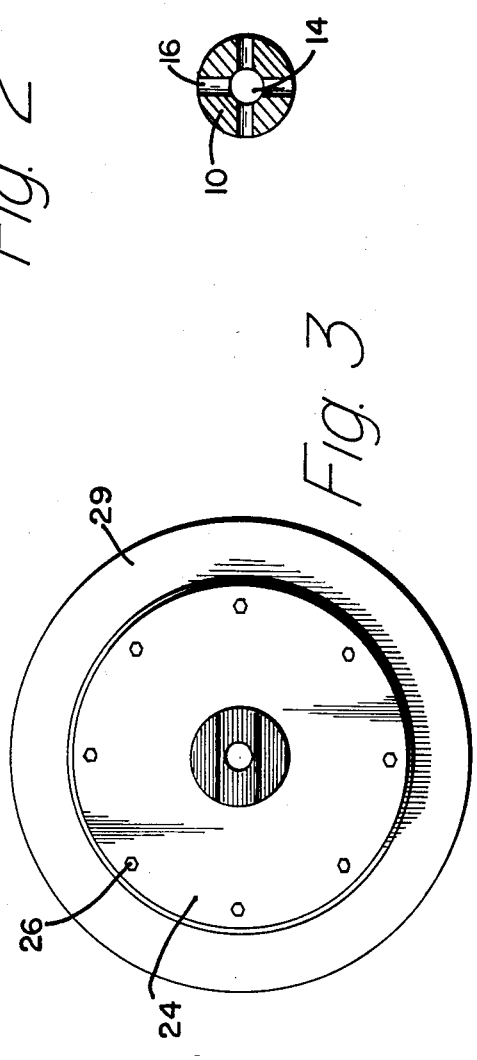
FIG. 3 represents an end view of the roll as seen in FIG. 2, this view taken on the line 3—3 thereof and looking in the direction of the arrows.

End seal plates 24 are retained in place by cap screws 26 which enter threaded holes provided and formed in the roller 19. The O-rings 20 and 22 are retained in grooves or shoulders formed in these end plates. Interior of the O.D. of these end seal plates 24 are formed water-cooling passageways 28 which are drilled lengthwise of the roller and have their ends open to the counterbores 18. Also formed in this metal roller 19 and exterior of end seal plates 24 are a multiplicity of vacuum-conducting or -communicating passageways 30. It is to be noted that each of these drilled passageways 30 are closed at one end as by plugs 31, which may be a press fit, a tightened pipe plug or by an attached plate 29 (see FIG. 3). The closing of these passageways is at only one end and at the same end. The manner of effecting a closure is merely a matter of preference.

The exterior peripheral surface of this roller 19 is formed with a multiplicity of pockets 32 which are contoured to provide the desired configuration in the softened plastic brought thereto. Each formed pocket 32 has an inner end portion in which an aperture or hole 33 is formed, providing communication with the passageways 30. A vacuum line 34 is connected to an arc-shaped suction distributor 36 which has a sealing edge, not shown, with the ends of this arc portion closed to exclude the loss of vacuum. The suction distributor is conventionally made of a very durable plastic whose face portion is very smooth and flat to engage and wipe the end of the roller. Water conductors 42 and 44 are diagrammatically shown and are indicated as communicating with end seal plate 24, but swivel connector means is not shown so as to remove confusion.

The arc segment 36 providing the distribution of the vacuum is selectively positioned so that vacuum is applied to the heat-softened film as it is brought to the roller. The vacuum is removed from these pockets when and as the film is sealed to another film and transferred to other operations. This roller is unique in that a single roller of aluminum is provided and is fixedly mounted on the steel shaft 10. The water flow through this roller is temperature-controlled so as to maintain the surface temperature of the roller within the desired and selected limits. The end surface of the roller in contact with the vacuum suction distributor 36 as the outer diameter surface of the roller is specially finished and treated to produce a very smooth and hard surface. This surface produces release properties and extended resistance to wear. The end of the roller to which the distributor 36 is pressed also has vacuum grease or lubricant which provides the desired vacuum seal during rotation of the roller. This prevents the distributor 36 from becoming unduly worn. The driving of this roller is by a chain or the like and is not depicted as such drive means is conventional.

The roller shown and described above contemplates that the outer roller portion 19 be of a metal such as aluminum which has rapid heat-transfer properties. Such a capability is very desirable as the surface temperature of the roller must be maintained within close limits to prevent the temperature of the heated film from becoming too cool or remain too warm during forming and welding operations. The roll may be made as a cast steel or as a casting of alloyed aluminum. Alloyed aluminum includes the addition of bronze, copper and/or other metals. These may be castings, extrusions or billets. The roll used herewith must have cost efficiencies as well as heat-transfer properties. If of alloyed aluminum, the desired rigidity may not be present and the desired properties of a steel shaft or journal are not readily available. If the roll is made as a steel casting, the cross-drilled holes 16 are required to be drilled at an angle or the recess 18 must be altered or a plug provided in a hole drilled from the outer surface. No matter the means of providing a water flow path through the conductors 28, a cast steel metal, although providing the desired rigidity, does not have the desired speed in heat transfer and it is noted that steel is much heavier than aluminum. For this reason, the roller of this invention is shown and discussed as aluminum, with the steel shaft 10 providing the desired rigidity or spine for the roller 19.

Figure 2:
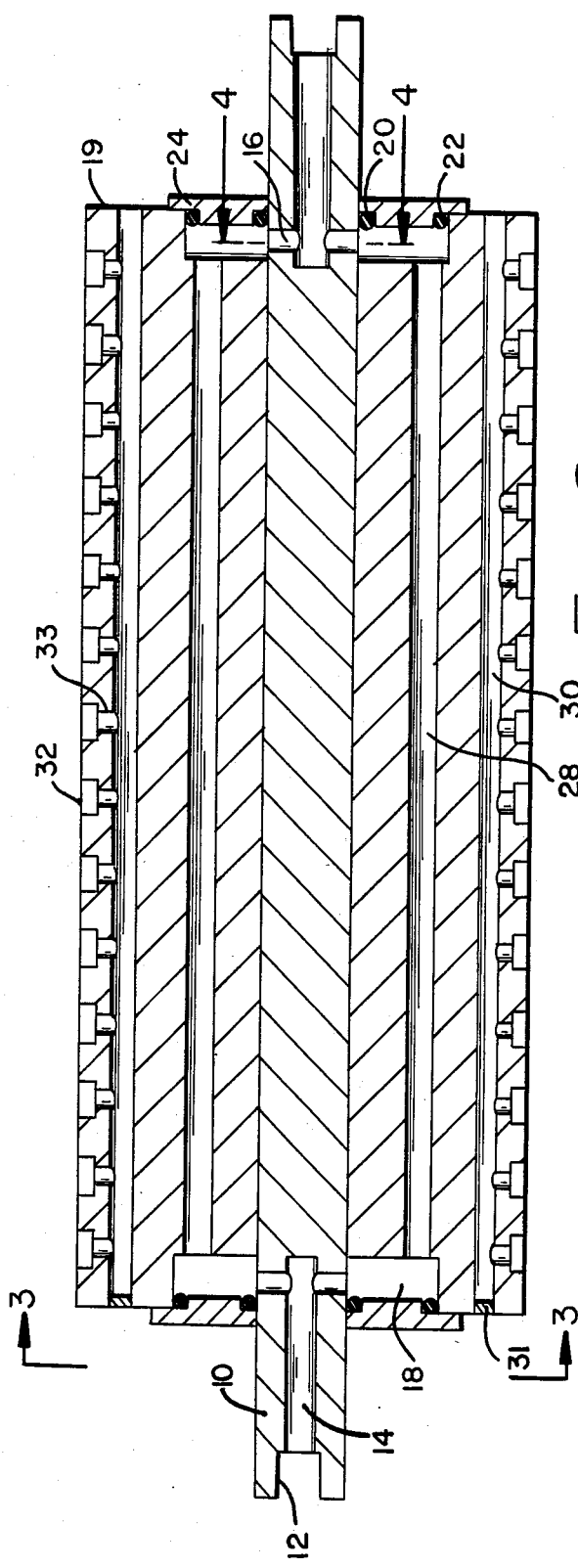
FIG. 2 represents a side sectional view, partly diagrammatic, and showing the relationship of the several components and the particular construction of this roll.
Figure 4:
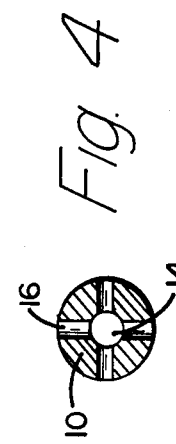
FIG. 4 represents a sectional view of the shaft drilling to provide distributed flow of water into and from the distributing recess.

The roll assembly construction, as shown in FIG. 2, anticipates that a counterbore 18 is and will be formed in each end of the roller 19. An alternate construction may have cover 24 with an outwardly-extending cup-shaped configuration so as to provide a fluid-carrying doughnut capability around the shaft 10. The O-ring 20 would still be required, but O-ring 22 may be eliminated in favor of a ring-like gasket. The cross-drill holes 16 would or could then be outside of the roll. A rotary connection to and from heating and cooling fluid is still needed. There may be other alternate constructions and configurations for a roller assembly, but the essential construction, shown above, and appropriate equivalents are contemplated.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the forming roller may be constructed or used.

While a particular embodiment of the forming roller for air-cushioning materials has been shown and described, it is to be understood that the invention is not limited thereto and protection is sought to the broadest extent the prior art allows.

What is claimed is:

1. A forming roller for use with a heated thermoplastic film as brought to this forming roll and when in contact with an outer diameter surface portion of said roller is vacuum-shaped and cooled to bring this heated film to a condition whereat said film is weldable to another film, this roller including:
   (a) a roller of metal having a heat-conducting property or capability for rapidly cooling or heating an outer surface of the roller and said heated film in contact therewith;
   (b) a central axial bore formed in this metal roller and having a precise size and with a counterbore formed in each end of the roller and substantially concentric with the axial bore;
   (c) a steel shaft of a length greater than the length of the finished roller, this shaft sized to be a press fit in the central bore of the roller, this steel shaft also having each end drilled to provide a fluid conduit from an external means to a cross-drilled pathway for fluid to the counterbore in the roll;
   (d) a multiplicity of fluid-conducting passageways formed longitudinally and substantially parallel to the axis of said roll, each of these passageways open at each end to a counterbore;
   (e) a pair of cover plates, each adapted to carry and retain a seal excluding the passage of fluid past the diameter of the shaft and another seal excluding the passage of fluid from the larger diameter of the counterbore and said cover plate, and means for removably securing a cover plate to the roller;
   (f) a multiplicity of vacuum conductors longitudinally formed in said roller and substantially parallel to the axis of this roller, said vacuum conductors closed at one end thereof, this closing being effected at the same ends with the other ends of said vacuum conductors terminating at a finished end surface of the roller, these vacuum conductors disposed exteriorly of the cover plates for the counterbores;
   (g) a multiplicity of vacuum cup cavities formed in the peripheral surface of the roller, each cavity configured to provide the localized formations in the heated plastic sheeting, each cup cavity having a communicating passageway from said cavity to an adjacent vacuum conductor;
   (h) a vacuum collector shoe having an arcuate face portion adapted to be pressed against that finished end of the roller having the open ends of the vacuum conductors, these open ends of said conductors arrayed in a circular pattern, said shoe when operatively positioned having means to and at the same instant apply vacuum to substantially one-half of all vacuum conductors so as to evacuate said cup cavities as heated film is brought to and carried on the peripheral surface of the roller and as and while rotating said arcuate shoe is not operatively engaging the open ends of the vacuum conductors as the roller is turned and the open end moves from in way of the arcuate shoe, and
   (i) means for connecting a source of vacuum to the arcuate shoe and temperature-controlling fluid to each end of the steel shaft so that fluid through rotary connecting means may be fed to and from the drilled hole in the steel shaft.

2. A forming roller as in claim 1 in which the roller is of aluminum or alloys thereof and the outer surface and at least the finished end portion in sliding contact with the vacuum collector shoe are specifically treated to make and provide a hard, wear-resistant surface.

3. A forming roller as in claim 2 in which the treated surface also includes providing a release property.

4. A forming roller as in claim 3 in which the vacuum shoe includes a contacting face portion of substantially rigid plastic having a flat face portion with an arcuate recess adapted to slide on the finished end of the roll and positioned so to come in way of the open ends of the vacuum conductors and there is provided a lubricant treatment on the finished end of the roller and the face of the shoe, the arcuate recess in the shoe connected to the source of vacuum with a flexible hose conductor which provides the connecting means.

5. A forming roller as in claim 4 in which the steel shaft has each end formed with a transverse slot to provide connecting means for a rotary fluid connection.

6. A forming roller as in claim 1 in which the seals provided with each cover plate include an O-ring sized and adapted to seat on the steel shaft and provide fluid exclusion and another O-ring sized and adapted to seat in the counterbore formed in each end of the roller and to provide a fluid seal exclusion when and as the cover plate is removably secured to the roller, said cover plate formed with shoulder retaining means for seating and retaining the shaft O-ring and the counterbore O-ring.

7. A forming roller as in claim 6 in which the removable securing of the cover plates is with cap screws arrayed in a determined pattern and with the threaded shanks of said cap screws entering and being retained in threaded holes formed in the ends of the roll.

8. A forming roller as in claim 1 in which the closing of one end of the vacuum conductors is by plug means.

9. A forming roller as in claim 1 in which the closing of one end of the vacuum conductors is by a secured plate-like ring and a sealing gasket.

10. A forming roller for use with a heated thermoplastic film as brought to this forming roll and when in contact with an outer diameter surface portion of said roller is vacuum-shaped and cooled to bring this heated film to a condition whereat said film is weldable to another film, this roller including:
   (a) a roller of aluminum or alloys thereof and having a heat-conducting property or capability for rapidly cooling or heating an outer surface of the roller and said heated film in contact therewith;
   (b) a central axial bore formed in this metal roller and having a precise size;
   (c) a steel shaft of a length greater than the length of the finished roller, this shaft sized to be a press fit in the central bore of the roller, this steel shaft also having each end drilled to provide a fluid conduit from an external means to a cross-drilled pathway for fluid to a pathway in the roller;

(d) a multiplicity of fluid-conducting passageways formed longitudinally and substantially parallel to the axis of said roller, each of these passageways in communication at each end to a fluid conduit;

(e) a pair of cover plates, each adapted to carry and retain a seal excluding the passage of fluid past the diameter of the shaft and another seal excluding the passage of fluid from the larger diameter of said cover plate, and means for removably securing a cover plate to the roller;

(f) a multiplicity of vacuum conductors longitudinally formed in said roller and substantially parallel to the axis of this roller, said vacuum conductors closed at one end thereof of said vacuum conductors terminating at a finished end surface of the roller, these vacuum conductors disposed exteriorly of the cover plates;

(g) a multiplicity of vacuum cup cavities formed in the peripheral surface of the roller, each cavity configured to provide the localized formations in the heated plastic sheeting, each cup cavity having a communicating passageway from said cavity to an adjacent vacuum conductor;

(h) a vacuum collector shoe having an arcuate face portion adapted to be pressed against that finished end of the roller having the open ends of the vacuum conductors, these open ends of said conductors arrayed in a circular pattern, said shoe when operatively positioned having means to and at the same instant apply vacuum to substantially one-half of said vacuum conductors so as to evacuate said cup cavities as heated film is brought to and carried on the peripheral surface of the roller and as and while rotating said arcuate shoe is not operatively engaging the open ends of the vacuum conductors as the roller is turned and the open end moves from in way of the arcuate shoe, and (i) means for connecting a source of vacuum to the arcuate shoe and temperature-controlling fluid to each end of the steel shaft so that fluid through rotary connecting means may be fed to and from the drilled hole in the steel shaft.

11. A forming roller as in claim 10 in which the aluminum portion is treated on its finished outer surface and finished end which are in sliding contact with the vacuum collector shoe to provide a hard, wear-resistant surface.

12. A forming roller as in claim 11 in which the treated surface also includes providing a release property.

13. A forming roller as in claim 12 in which the vacuum shoe includes a contacting face portion of substantially rigid plastic having a flat face portion with an arcuate recess adapted to slide on the finished end of the roll and positioned so to come in way of the open ends of the vacuum conductors and there is provided a lubricant treatment on the finished end of the roller and the face of the shoe, the arcuate recess in the shoe connected to the source of vacuum with a flexible hose conductor which provides the connecting means.

14. A forming roller as in claim 10 in which the closing of one end of the vacuum conductors is by plug means.

15. A forming roller as in claim 10 in which the closing of one end of the vacuum conductors is by a secured plate-like ring and a sealing gasket.

* * * * *